United States Patent [19]
Rangan

[11] Patent Number: 5,955,981
[45] Date of Patent: Sep. 21, 1999

[54] SECURITY FOR REMOTE OPERATION DEVICES

[76] Inventor: Karur S. Rangan, 36 Aberfeldy Crescent, Thornhill Ontario, Canada, L3T 4C2

[21] Appl. No.: 08/766,324

[22] Filed: Dec. 12, 1996

Related U.S. Application Data

[60] Provisional application No. 60/008,755, Dec. 12, 1995.
[51] Int. Cl.⁶ .................................................. G08C 19/00
[52] U.S. Cl. .................... 341/173; 341/176; 340/825.31; 340/825.34; 307/10.4
[58] Field of Search .................................... 341/176, 173; 340/825.69, 825.31, 825.34, 426; 307/10.4, 10.1

[56] References Cited

U.S. PATENT DOCUMENTS

| | | |
|---|---|---|
| 4,742,327 | 5/1988 | Burgess et al. ..................... 340/426 |
| 4,754,255 | 6/1988 | Sanders et al. ..................... 307/10.4 |
| 4,887,064 | 12/1989 | Drori ..................................... 340/426 |
| 5,790,043 | 8/1998 | Hettich ............................. 340/825.31 |

*Primary Examiner*—Michael Horabik
*Assistant Examiner*—Albert K. Wong
*Attorney, Agent, or Firm*—Carr and Ferrell LLP

[57] ABSTRACT

A remote controlled system for providing security measures includes an input interface through which a user can provide commands to secure and access a remote object. A security unit is coupled to the input interface and is responsive to the commands to perform protective functions. A transmission control unit is coupled to the security unit and is responsive to the protective functions to transmit signals to the remote object.

54 Claims, 3 Drawing Sheets

SECURITY FOR REMOTE OPERATION DEVICES

REFERENCE TO PROVISIONAL APPLICATIONS TO CLAIM PRIORITY

This application claims priority in provisional application filed on Dec. 12, 1995, entitled SECURITY FOR REMOTE OPERATION DEVICES, U.S. Ser. No. 60/008,755, by inventor Karur S. Rangan.

BACKGROUND OF THE INVENTION

1. Field of the Invention

The present invention relates generally to remote controlled systems for providing security measures and more specifically to a remote keyless entry system for providing security for automobiles.

2. Background Art

Car manufacturers currently equip cars with remote keyless entry systems which provide security benefits. Conventional remote keyless entry systems are typically attached to the key holder which holds the car key and may include a "car key security coding device." However, if the key holder falls into the hands of an unauthorized person, that person can simply walk around a parking lot while pressing the "open" or "panic" button on the conventional remote keyless entry system until the lights of the automobile which the key opens light up, and identify the automobile. Thus the key holder becomes a locating device for an unauthorized user, and allows entry simply by pressing the "open" button on the remote keyless entry system.

Thus, conventional remote control security devices can be used by unauthorized users to: (1) trigger the operations of the remote control security device; (2) circumvent other security measures in the car or in the remote control security device; and (3) locate and identify the "protected" car or other objects.

In addition, conventional remote control security devices have been designed primarily to achieve: ease of operations, and simplicity and economy in construction. Conventional remote control security devices have not provided security against unauthorized use of the remote control security device itself.

Additionally, security measures against the unauthorized use of conventional remote control security devices have all been the responsibility of the car owner, and have involved touch sensors that trigger horn and/or flashing light alarms. Consequently, such sensors are annoying to passers-by and neighbors. Moreover, although alarms have become common they sometimes prove to be ineffective in preventing break-ins or theft.

One remote control key system that uses an alarm is disclosed in U.S. Pat. No. 4,754,255, which is fully incorporated herein by reference.

Some other keyless automobile security systems focus on security features attached to the automobile itself are objectionably expensive. A car-door mounted automobile security system is disclosed in U.S. Pat. No. 4,742,327, which is fully incorporated herein by reference.

What is needed is an inexpensive remote control security device capable of security measures against unauthorized use of the remote control security device itself.

SUMMARY OF THE INVENTION

The present invention comprises a remote controlled system, such as a keyless entry device, for providing security measures to a remote object such as an automobile. The remote controlled system includes an input interface through which a user can provide commands to secure and access the remote object. A security unit is coupled to the input interface and is responsive to the commands to perform protective functions. A transmission control unit is coupled to the security unit and is responsive to the protective functions to transmit signals to the remote objects.

The invention has the advantages of providing security for the remote keyless entry device itself, and of resetting the security measures and, following a user entering the correct security code in the input interface after the elapse of a predetermined period of time, turning off. The invention provides additional security measures for the remote keyless entry device by requiring the user to wait until a predetermined "authentication wait" period has expired and then enter the desired operational commands in the device. A further security measure allows only an "armed duration" period during which the user can enter desired operational commands. Another security measure tracks the number of operations executed and resets the security measures or turns off the entry device when the preset limit of executed operations has been achieved.

These various security measures insure that an unauthorized user will not gain access to the secured object by simply inputting a random combination of codes into the input interface. Thus, even if an unauthorized user is able to locate the secured object, entry will not be possible until and unless the correct security code is entered in the input interface.

The invention also has the advantage of not increasing manufacturing costs, since existing hardware buttons in conventional remote keyless devices may be used for inputting the security code. In addition, the invention has the advantage of not informing an unauthorized user if the correct security code has been entered.

DETAILED DESCRIPTION OF THE PREFERRED EMBODIMENTS

Figure 1:
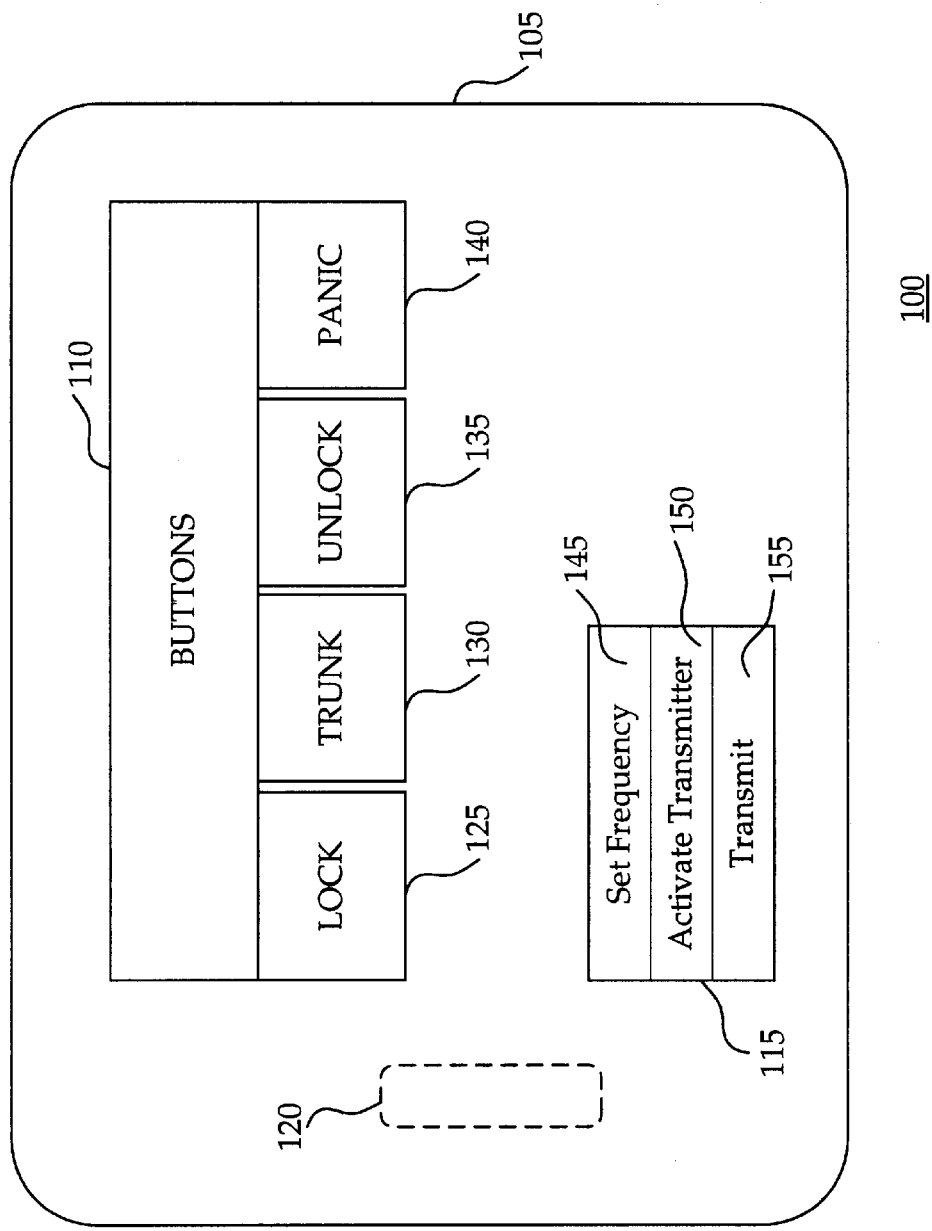
FIG. 1 shows a remote key-less device according to a preferred embodiment of the present invention.

FIG. 1 shows a remote key-less device 100 according to a preferred embodiment of the present invention including a housing 105, a button assembly 110 and a transmission control unit 115. Housing 105 is made of plastic and contains a power supply 120 such as a battery. Button assembly 110 includes a LOCK button 125 for locking the doors of a car, a TRUNK button 130 for releasing the trunk of the car, an UNLOCK button 135 for unlocking the doors of the car, and a PANIC button 140 for announcing the car location to the user of the remote key-less device 100. The LOCK button 125 performs an "unsecured operation" (i.e., locking the car door). The TRUNK 130, UNLOCK 135 and PANIC 140 buttons perform "secured operations" (i.e., unlocking the car doors or trunk or locating the car).

The transmission control unit 115 is an integrated circuit assembly in the housing 105. The transmission control unit 115 performs various logical functions. In the SET FRE- QUENCY 145 function, the transmission control unit 115 selects a frequency that corresponds to one of the pressed LOCK 125, TRUNK 130, UNLOCK 135 or PANIC 140 buttons.

The ACTIVATE TRANSMITTER 150 function activates the transmission control unit 115. In the TRANSMIT 155 function, the transmission control unit 115 transmits a signal based on the frequency selected by the SET FREQUENCY 145 function to perform an operation such as unlocking the car door or trunk. The signal is transmitted several times to ensure reliable operation.

Figure 2:
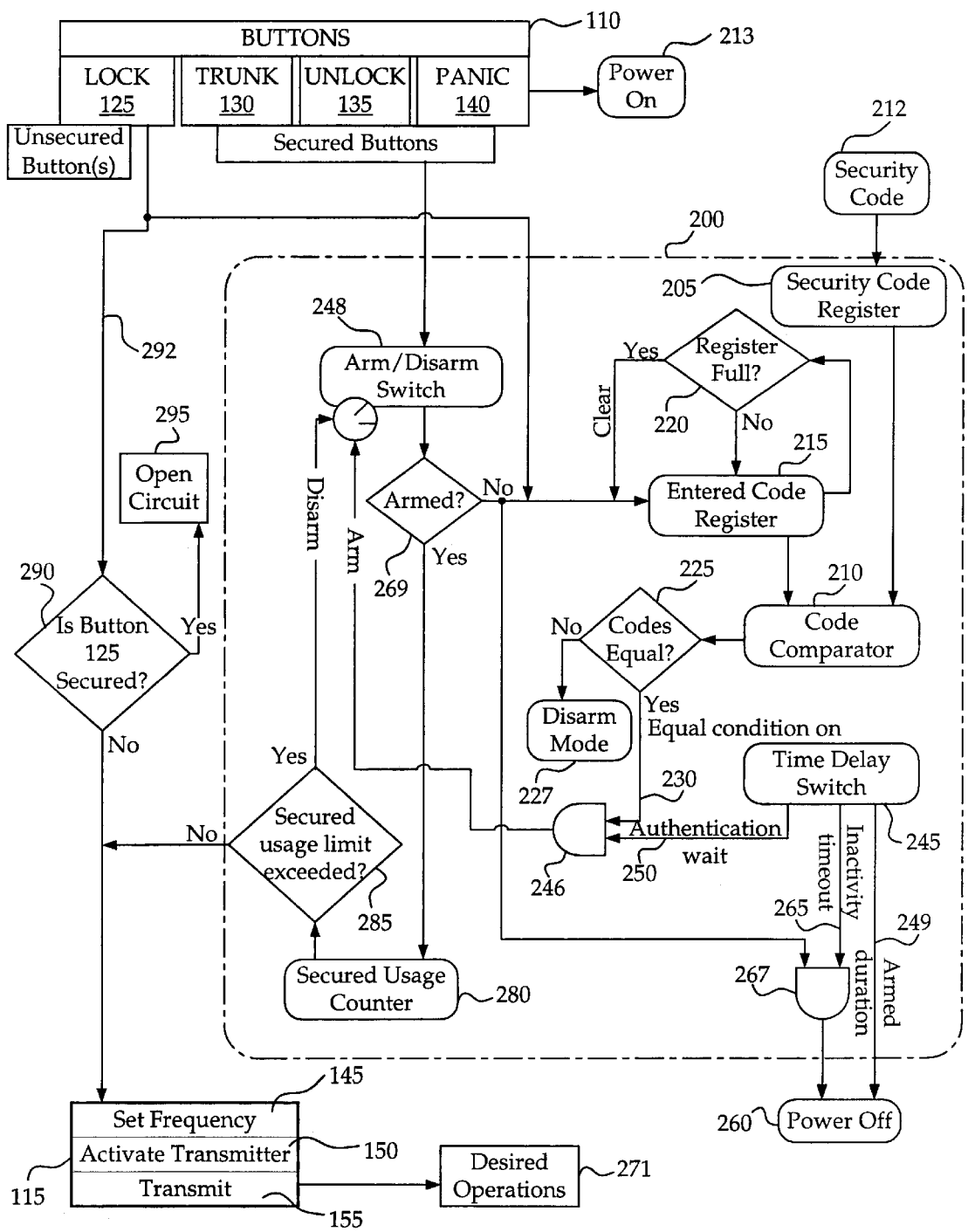
FIG. 2 is a functional block diagram of the remote key-less device according to a preferred embodiment of the present invention.

FIG. 2 is a functional block diagram of a system 200 which is coupled between the button assembly 110 and the transmission control unit 115 of FIG. 1 for providing security features for the remote keyless device. System 200 includes a security code register 205 which is factory-programmed with a security code 212. In the preferred embodiment, the security code 212 can only be read by the system 200, and a user of this invention will not be able to modify the security code 212. However, the system 200 hardware and/or software may be modified in an alternative embodiment to allow the security code 212 to be programmed in the security code register 205 by the user or a security code administrator, such as a car dealer. The security code 212 is programmed in terms of the encoded operations buttons (125, 130, 135 and 110) in button assembly 110. For example, the security code 212 may be programmed as "LLUT." To input this example security code, a user of the invention first turns on the invention (shown as power-on state 213) by pressing the first button in the security code 212 sequence, i.e. LOCK button 125, and presses the remaining buttons in the sequence, namely, LOCK 125, UNLOCK 135, TRUNK 130 buttons in button assembly 110. The security code register 205 is programmable to contain a sequence of up to preferably seven (7) encoded operations, for example, LLLLTPU, as the maximum length for the security code 212.

An entered-code register 215 records the sequence of buttons 125, 130, 135 or/and 140 pressed by a user. The capacity of entered code register 215 is preferably greater than the length of the security code 212. For example, if security code 212 has a length of seven (7), e.g., LLLTPU, then the capacity of entered code register 215 may be eight (8).

After the entered code register 215 is full, as indicated by a decision logic block 220, the entered code register 215 will be cleared when a user presses a button 125, 130, 135 or 140. When the entered code register 215 is cleared, system 200 generates an audible sound which alerts the user that a new sequence of buttons 125, 130, 135 and/or 140 have been started, but does not reflect the length of the security code 212. This provides a means for resetting the entered code; otherwise a reset will occur after the inactivity time-out period.

The security code register 205 and the "entered code" register 215 are coupled to a code comparator 210 which compares the contents of the security code register 205 against those of the entered code register 215 to determine whether the user has entered the correct code. As indicated by the decision logic block 225, when the contents of entered code register 215 and of security code register 205 are equal, then the equal condition 230 path is taken. When the contents of entered code register 215 and of security code register 205 are not equal, then the disarmed mode path 227 is taken.

The security code 212 is preferably selected by the user pressing buttons 125, 130, 135 and 140 to minimize the cost of the invention, but additional buttons could be added for entering a more complex security code 212.

A time delay switch 245 has three features. The first feature is an "authentication wait" 250, which requires the user, after correctly matching the security code 212, to pause for a predetermined time.

If the user presses the secured buttons 130, 135 or/and 140 before the "authentication wait" 250 time has expired, then code comparator 210 reverts to the unequal condition which shifts the system 200 into the disarmed mode 227, and then the user will not be able to use the buttons 130, 135 and 140 to perform secured operations. Thus the "authentication wait" 250 time is another safeguard that prevents an unauthorized user from correctly "guessing" the code that matches the programmed security code 212 and in using the device.

As stated above, if the code entered into the entered code register 215 matches the security code 212, then the code comparator 210 causes operation to follow the equal condition path 230. The decision logic 225 and the time delay switch 245 outputs are coupled through an AND gate 246 to an arm/disarm switch 248.

After the "authentication wait" 250 time has expired, the system 200 shifts into an "armed mode" allowing the user to use buttons 130, 135 and 140 for performing secured operations such as locating the car or unlocking the car doors or trunk.

The invention should not encumber the user when locking his or her car, so the LOCK button 125 preferably does not require authentication. Accordingly, the signal from the pressed LOCK button 125 is driven directly to the transmission control unit 115 for locking the car door.

The time delay switch 245 also has an "armed duration" 249 feature, which allows the user only a predetermined period of time to press the buttons 130, 135 or/and 140 for performing the secured operations. After the "armed duration" 249 time period expires, the system 200 reverts to the disarmed mode 227 and the invention is then turned off (power-off state 260). The armed duration 249 feature provides additional security. For example, the user may have placed the invention in an armed mode while still at a distance from his/her secured car. If the user misplaces the invention prior to reaching his/her car and the "armed duration" 249 time period expires, then an unauthorized user who finds the device will not have access to the secured operations.

The time delay switch 245 is also coupled by AND gate 267 to a decision logic block 269 for turning off the invention. The time delay switch 245 includes an inactivity timeout 265 feature, which prevents drainage of the battery 120 (FIG. 1) if the buttons 125, 130, 135 or/and 140 are accidentally pressed by the user during the disarmed mode 227. However, the inactivity timeout 265 feature is not operational when the system 200 is in the armed mode. The inactivity timeout 265 time period is longer than the authentication wait 250 time period, so that the inactivity timeout 265 does not conflict with the authentication wait 250 time period prior to arming the invention.

The arm/disarm switch 248 couples the button assembly 110 to the entered code register 215 and to the transmission control unit 115. The arm/disarm switch 248 is used to direct signals from the button assembly 110 when the buttons 125, 130, 135 or/and 140 are pressed. When the invention is in the "disarmed mode," the signals from the pressed buttons 130, 135 or/and 140 for secured operations are directed into the entered code register 215. In the "armed mode," the signals from the pressed buttons 130, 135 or/and 140 are directed to the transmission control unit 115 to perform desired operations 271 including locating the car and unlocking the doors or trunk.

A secured usage counter 280 is also coupled to the button assembly 110 by the arm/disarm switch 248. The secured usage counter 280 provides additional security by tracking the number of times the secured operations have been executed during the armed mode. For example, the system 200 may be set so that only one or two secured operations can be done during the armed mode. If this secured-operation usage limit is exceeded (see decision logic 285), then system 200 is forced into the disarmed mode. If the secured-operations usage limit has not been exceeded, then the desired operations 271 may be performed by the transmission control unit 115, based on signals from the decision logic 285. Thus, the secured usage counter 280 provides additional security measures for the system 200.

As an additional feature, the LOCK button 125 may be modified to change the operation of locking the car doors from unsecured into secured, thereby preventing an unauthorized user from hearing the "locking" sounds to locate the car. Using decision logic block 290, the LOCK button 125 can be set as secured or unsecured in the factory. If the LOCK button 125 is unsecured, then LOCK button 125 remains coupled to the transmission control unit 115 by path 292. If the LOCK button 125 is secured, then path 292 will be replaced by an open circuit condition 295 between the LOCK button 125 and the transmission control unit 115. Thus the LOCK button 125 will follow, in the system 200, the secured logic path which is followed by the TRUNK 130, UNLOCK 135 and PANIC 140 secured buttons.

Figure 3:
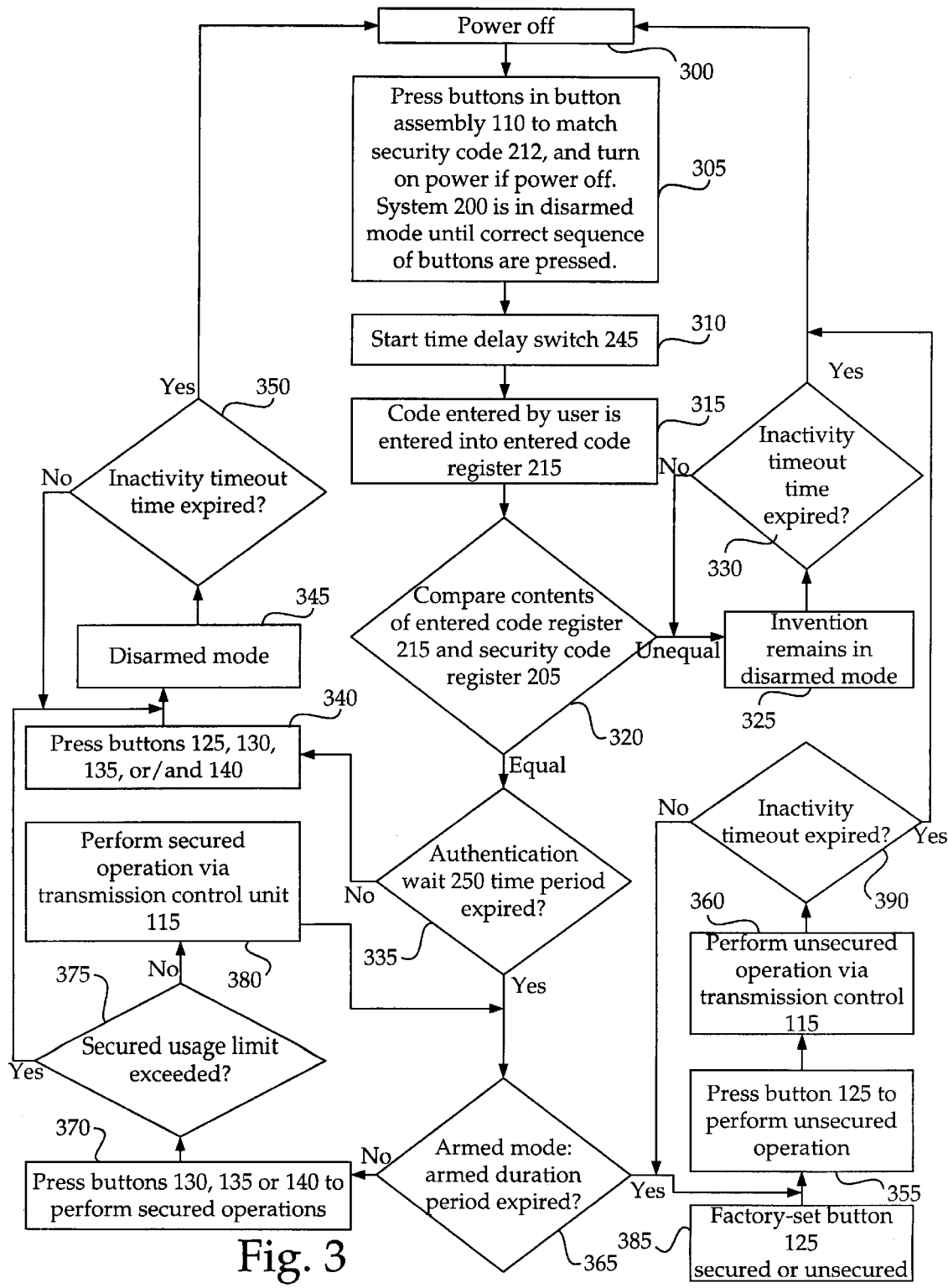
FIG. 3 is a flowchart illustrating a method of operation according to the present invention.

FIG. 3 is a flowchart illustrating a method of operation of the present invention, which may be implemented by hardware or software or a combination of the two. In step 300, the power to the remote keyless device is switched off.

In step 305, if the power is initially off the invention is turned on by pressing the button corresponding to the first letter programmed in the security code 212, for example, the lock button for the first letter of security code "LLUT" (see FIG. 2). If the power is initially on, then the first button pressed is input also as the first button of the security code.

The user then presses the remaining buttons in the sequence, namely, LOCK 125, UNLOCK 135, TRUNK 130 buttons in button assembly 110 to match the programmed security code 212 "LLUT," thereby placing the invention in the "armed mode."

In step 310, the time delay switch 245 (see FIG. 1) is started. In step 315, the code entered by the user in step 305 is input into code register 215 (see FIG. 2). In step 320, the code comparator 210 compares the contents of the entered code register 215 to those of the security code register 205. If the contents of the registers are not equal, then the invention remains in the disarmed mode (step 325). In step 330, as long as the "inactivity timeout" 265 period has not expired, the invention remains in the disarmed mode of step 325. When the inactivity timeout 265 period expires, the invention proceeds to step 300 and turns off.

After step 320, if the contents of the registers are equal, then in step 335 the user must pause until the "authentication wait" 250 time period has expired. If prior to the expiration of the "authentication wait" 250 period the user presses a button in button assembly 110 (step 340), then the invention remains in the disarmed mode (step 345). In step 350, if the inactivity timeout 265 period has not expired, then the invention remains in the disarmed mode (step 345). If the inactivity timeout 265 period expires, then the invention turns off (step 300).

After step 335, if the user has not pressed any buttons and if the authentication wait 250 period has expired, then the system is placed in an armed mode (step 365). The user must perform any desired secured operations, via buttons 130, 135 and 140, and may perform unsecured operations within the armed duration 249 (FIG. 2) period which may for example be set at five (5) minutes. In step 370, the armed duration 249 period has not expired, and thus the user can press the buttons 130, 135 and 140 to perform the secured operations such as unlocking the car doors or trunk. As shown in step 375, before the secured operations are performed, the invention determines if the number of times the secured operations have been executed during the armed duration 249 period exceeds the secured-operation usage limit, which may be programmed so that only one or two secured-operations are allowed during the armed duration 249 period. If the secured-operations usage limit has been exceeded, then the invention turns off (step 300). In step 380, if the secured-operations usage limit has not been exceeded, then the invention performs the secured operations via the transmission control unit 115. After the armed duration 249 period has expired, the invention proceeds to step 355. The user can proceed to press LOCK button 125 (step 355) to initiate via the transmission control unit 115, the unsecured operation of locking the car doors (step 360).

In step 385, the LOCK button 125 (see FIG. 2) can be set as secured or unsecured in the factory. If the LOCK button 125 (see FIG. 2) is unsecured, then the user may press the lock button 125 (see FIG. 2) in step 305 to lock the doors (step 355). If the user decides that the LOCK button 125 (see FIG. 2) should become secured, then the LOCK button 125 functions to lock the car door after authentication (step 335) and during the armed duration period (step 365). Under step 390, as long as the "inactivity timeout" 265 period has not expired, the user can press the LOCK button 125 to perform unsecured operations (step 355). When the inactivity timeout 265 period expires, the invention proceeds from step 390 to step 300 and turns off.

While various embodiments and applications of this invention have been shown and described, it will be apparent to those skilled in the art that various modifications are possible without departing from the inventive concepts described herein. The invention, therefore, is not to be restricted except in the spirit of the appended claims.

What is claimed is:

1. A system for providing security measures for a remote operation device, comprising:

an input interface through which a user can provide commands to secure and access a remote operation device and a remote object;

a security unit coupled to said input interface and responsive to said commands to perform protective functions; and a transmission control unit including a transmitter, coupled to said security unit and responsive to said protective functions to transmit signals to said remote object;

whereby the input interface, security unit, and transmission control unit provide security for the remote operation device.

2. The system of claim 1 wherein said commands permit access to said remote operation device and said remote object during a transmitter armed mode and prevent access to said remote operation device and said remote object during a transmitter disarmed mode.

3. A security system for providing security measures for a remote operation device, comprising:
   an input interface configured to receive user inputs for securing and accessing a remote operation device and a remote object;
   a security unit disposed within said input interface for providing protective measures to permit and prevent security and access of said remote object; and
   a transmission control unit comprising a transmitter, coupled to said security unit, and responsive to said user inputs by transmitting signals to permit security and access of said remote object, said transmitter being enabled to transmit said signals during a transmitter armed mode to permit access of said remote object, said transmitter being prevented from transmitting said signals during a transmitter disarmed mode;
   whereby the input interface, security unit, and transmission control unit provide security for the remote operation device.

4. The security system of claim 3 wherein said transmitter is enabled to transmit said signals during said armed mode to permit security of said remote object.

5. The security system of claim 3 wherein said input interface comprises:
   a keypad configured to receive said user inputs for securing and accessing said remote operation device and said remote object.

6. The security system of claim 5 wherein said keypad comprises:
   a first key which can be actuated to secure a first compartment of said remote object;
   a second key which can be actuated to access a second compartment of said remote object;
   a third key which can be actuated to access said first compartment; and
   a fourth key which can be actuated to locate said remote object.

7. The security system of claim 6 wherein said first compartment comprises:
   a passenger area in said remote object.

8. The security system of claim 6 wherein said second compartment comprises:
   a storage area in said remote object.

9. The security system of claim 3 wherein said security unit comprises:
   a security code register for storing a first value;
   an entered code register connected to said input interface for storing a second value;
   a code comparator, connected to said entered code register and to said security code register, for comparing said first value and said second value; and
   an arm/disarm switch connected to said input interface for enabling said transmitter to transmit signals responsive to said user inputs.

10. The security system of claim 9 wherein said arm/disarm switch enables said transmitter to transmit signals for accessing said remote operation device and said remote object.

11. The security system of claim 9 wherein said arm/disarm switch enables said transmitter to transmit signals for securing said remote object.

12. The security system of claim 9 wherein said security unit further comprises:
   a first decision logic circuit connected to said code comparator for enabling said armed mode when said first value and said second value are equal and for enabling said disarmed mode when said first value and said second value are not equal.

13. The security system of claim 9 wherein said security unit further comprises:
   a second decision logic circuit connected to said entered code register for deleting said second value in said entered code register if an additional value is entered into said entered code register when said entered code register is at a maximum count;
   whereby the length of the first value is protected from disclosure.

14. The security system of claim 9 wherein said security unit further comprises:
   an AND gate having an output connected to said arm/disarm switch, having a first input connected to said first decision logic circuit and having a second input;
   a time delay switch connected to said second input of said AND gate, said time delay switch and said AND gate being configured to enable said disarmed mode if at least one of said user inputs is entered prior to expiration of a first predetermined time period;
   whereby the AND gate and the time delay switch authenticate an authorized user.

15. The security system of claim 14 wherein said time delay switch includes an armed duration feature for setting said armed mode to a second predetermined time period;
   whereby use of said input interface after arming is for a limited time duration to provide security from unauthorized use of the remote operation device.

16. The security system of claim 14 wherein said time delay switch includes an inactivity timeout feature which turns off said transmitter during said disarmed mode upon expiration of a third predetermined time period which is longer than said first predetermined time period.

17. The security system of claim 9 wherein said security unit further comprises:
   a third decision logic circuit connected to said arm/disarm switch and configured to output an armed mode signal during said armed mode and a disarmed mode signal during said disarmed mode;
   a secured usage counter connected to said third decision logic circuit, and configured to receive said armed mode signal and to count the occurrence of said user inputs during said armed mode;
   a fourth decision logic circuit connected to said secured usage counter, to said arm/disarm switch and to said transmission control unit, and configured to permit access of said remote operation device and said remote object in response to said user inputs during said armed mode if the value of said secured usage counter is less than a predetermined counter value, said fourth decision logic circuit further being configured to prevent access of said remote operation device and said remote object during said armed mode if the value of said secured usage counter rises to said predetermined counter value.

18. The security system of claim 17 wherein said fourth decision logic circuit permits said transmitter to emit signals responsive to said user inputs by actuating said arm/disarm switch.

19. The security system of claim 6 wherein:
   said transmitter enables security of said remote object by emitting a first predetermined frequency corresponding to said first key, said transmitter enables access of said remote object by emitting a second predetermined frequency corresponding to said second key and a third predetermined frequency corresponding to said third key, and said transmitter enables location of said remote object by emitting a fourth predetermined frequency corresponding to said fourth key.

20. The security system of claim 19 wherein said first key is coupled to said transmitter so that said first predetermined frequency is emitted upon actuation of said first key.

21. The security system of claim 19 wherein said first key is coupled to said security unit.

22. The security system of claim 3 wherein said transmission control unit is an integrated circuit assembly.

23. The security system of claim 3, further comprising:
a power supply disposed within said input interface for providing power to said security unit and to said transmission control unit.

24. A security system for providing security measures for a remote operation device, comprising:
receiving means for receiving user inputs for securing and accessing a remote operation device and a remote object;
security means coupled to said receiving means for providing protective measures to permit and prevent security and access of said remote operation device and security and access of said remote object; and
transmission means, capable of being in an armed mode or in a disarmed mode, coupled to said security means for transmitting signals to permit access and security of said remote object;
whereby the receiving means, security means, and transmission means provide security for a remote operation device.

25. The security system of claim 24 wherein said security means comprises:
first means for permitting access of said remote object in response to said user inputs during an armed mode and for preventing access of said remote object during a disarmed mode.

26. The security system of claim 25 wherein said security means further comprises:
second means for permitting security of said remote object during an armed mode and during a disarmed mode.

27. The security system of claim 25 wherein said security means further comprises:
third means for permitting security of said remote object in response to said user inputs during an armed mode and for preventing security of said remote object during a disarmed mode.

28. The security system of claim 25 wherein said security means further comprises:
first storing means for storing a first value;
second storing means for storing a second value;
comparing means, coupled to said first storing means and to said second storing means, for comparing said first value with said second value; and
first decision means coupled to said comparing means for enabling said armed mode if said first value and said second value are equal and for enabling said disarmed mode if said first value and said second value are not equal.

29. The security system of claim 28 wherein said security means further comprises:
second decision means coupled to said second storing means for deleting said second value stored in said second storing means if an additional value is stored in said second storing means when said second storing means is at a maximum count;
whereby the length of the first value is protected from disclosure.

30. The security system of claim 29 wherein said security means further comprises:
means coupled to said first decision means for enabling said disarmed mode if said user inputs are entered prior to expiration of a first predetermined time period;
whereby the means provide an authentication of an authorized user.

31. The security system of claim 30 wherein said security means further comprises:
means coupled to said enabling means for setting said armed mode to a second predetermined time period;
whereby use of said receiving means after arming is for a limited time duration to provide security from unauthorized use of the remote operation device.

32. The security system of claim 31 wherein said security means further comprises:
switching means coupled to said receiving means for permitting transmission of said signals in response to said user inputs to permit access of said remote object.

33. The security system of claim 32 wherein said security means further comprises:
third decision means for generating an armed mode signal during said armed mode and for generating a disarmed mode signal during said disarmed mode;
counter means coupled to said third decision means for receiving said armed mode signal and for counting the occurrence of said user inputs; and
fourth decision means coupled to said counter means for permitting access of said remote object in response to said user inputs during said armed mode if the value of said counter means is less than a predetermined value and for preventing access of said remote object during said armed mode if the value of said counter means rises to said predetermined value.

34. A method for providing security measures to a remote operation device comprising the steps of:
receiving user inputs for securing and accessing a remote operation device and a remote object;
providing protective measures to permit and prevent security and access of said remote operation device and said remote object; and
transmitting signals to permit access and security of said remote object;
whereby security is provided for said remote operation device.

35. The method of claim 34 wherein said step of providing protective measures further comprises the step of:
permitting access of said remote object in response to said user inputs during an armed mode and preventing access of said remote object during a disarmed mode.

36. The method of claim 34 wherein said step of providing protective measures further comprises the step of:
permitting security of said remote object in response to said user inputs during an armed mode and during a disarmed mode.

37. The method of claim 34 wherein said step of providing protective measures further comprises the step of:
permitting security of said remote object in response to said user inputs during an armed mode and preventing security of said remote object during a disarmed mode.

38. The method of claim 34 wherein said step of providing protective measures further comprises the steps of:

storing a first value in a first register;

storing a second value in a second register;

comparing said first value with said second value; and enabling said armed mode when said first value and said second value are equal and enabling said disarmed mode when said first value and said second value are not equal.

39. The method of claim 38 wherein said step of providing protective measures further comprises the step of:

deleting said second value in said second register if an additional value is stored in said second register when said second register is at a maximum count.

40. The method of claim 34 wherein said step of providing protective measures further comprises the step of:

permitting transmission of said signals in response to said user inputs to permit access of said remote object.

41. The method of claim 34 wherein said step of providing protective measures further comprises the step of:

generating an armed mode signal during said armed mode and generating a disarmed mode signal during said disarmed mode;

receiving said armed mode signal and counting the occurrence of said user inputs; and permitting access of said remote object in response to said user inputs during said armed mode if the occurrence of said user inputs is less than a predetermined value and preventing access of said remote object during said armed mode if the occurrence of said user inputs rises to said predetermined value.

42. The method of claim 35 further comprising the step of:

setting said armed mode to a second predetermined time period.

43. An apparatus for providing security measures to a remote operation device comprising:

first means for providing a first mode which permits access of a remote operation device and a remote object in response to user inputs; and second means for providing a second mode which prevents access of said remote operation device and said remote object;

whereby security is provided for said remote operation device.

44. The apparatus of claim 43, further comprising:

third means for permitting access of said remote object in response to said user inputs during said first mode if the occurrence of said user inputs is less than a predetermined value and for preventing access of said remote object if the occurrence of said user inputs rises to said predetermined value.

45. The apparatus of claim 44 further comprising:

fourth means for permitting security of said remote object in response to said user inputs during said first mode and for preventing security of said remote object during said second mode.

46. A method for performing security measures to a remote operation device comprising the steps of:

providing a first mode which permits access of a remote operation device and a remote object in response to user inputs; and providing a second mode which prevents access of said remote operation device and said remote object;

whereby security is provided for said remote operation device.

47. The method of claim 46 further comprising the step of:

permitting access of said remote object in response to said user inputs during said first mode if the occurrence of said user inputs is less than a predetermined value and preventing access of said remote object if the occurrence of said user inputs rises to said predetermined value.

48. The method of claim 46 further comprising the step of:

permitting security of said remote object in response to said user inputs during said first mode and preventing security of said remote object during said second mode.

49. A system for providing security measures to a remote operation device comprising:

a protection component configured to generate a first mode permitting access of a remote operation device and a remote object in response to user inputs and configured to generate a second mode preventing access of the remote operation device and the remote object; and a transmitter coupled to said protection component for transmitting signals to permit access of the remote object.

50. The system of claim 49 wherein said protection component is configured to permit security of said remote object during said first mode and to prevent security of said remote object during said second mode.

51. The system of claim 49 wherein said protection component permits access of said remote object in response to said user inputs during said first mode if the occurrence of said user inputs is less than a predetermined value and prevents access of said remote object if the occurrence of said user inputs rises to said predetermined value.

52. The security system of claim 29 wherein said security means further comprises:

third decision means for generating an armed mode signal during said armed mode and for generating a disarmed mode signal during said disarmed mode;

counter means coupled to said third decision means for receiving said armed mode signal and for counting the occurrence of said user inputs; and fourth decision means coupled to said counter means for permitting access of said remote object in response to said user inputs during said armed mode if the value of said counter means is less than a predetermined value and for preventing access of said remote object during said armed mode if the value of said counter means rises to said predetermined value.

53. The apparatus of claim 43 further comprising:

fourth means for permitting security of said remote object in response to said user inputs during said first mode and for preventing security of said remote object during said second mode.

54. The method of claim 47 further comprising the step of:

permitting security of said remote object in response to said user inputs during said first mode and preventing security of said remote object during said second mode.

* * * * *